United States Patent Office 2,816,611
Patented Dec. 17, 1957

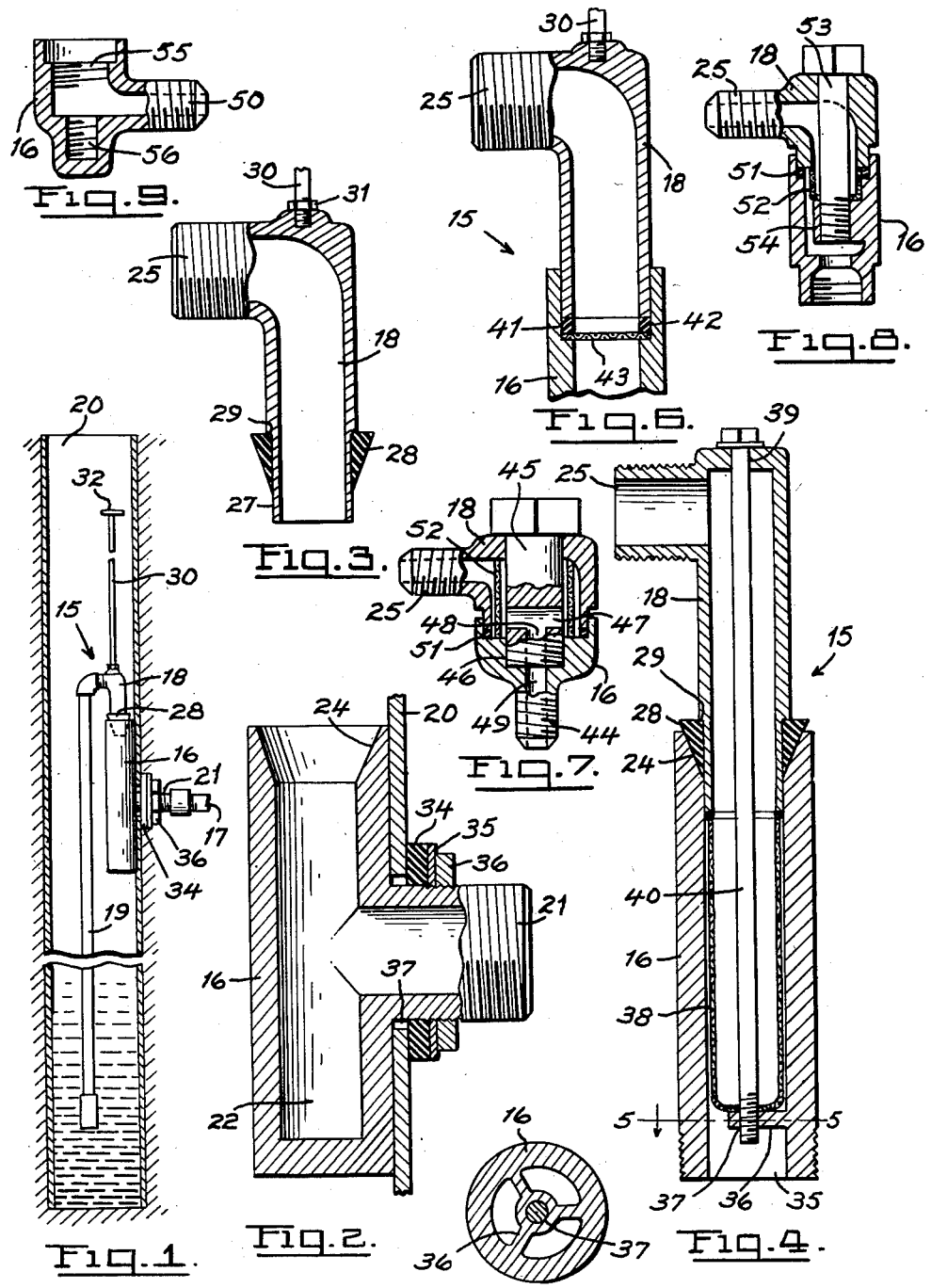

2,816,611

PIPE AND TUBE COUPLINGS AND FITTINGS

Einar Dokken, Ottawa, Ontario, Canada

Application August 10, 1955, Serial No. 527,473

2 Claims. (Cl. 166—85)

This invention relates to new and useful improvements in pipe and tube couplings and fittings.

The prime concept of the present invention is to provide means for coupling pipes or tubes and fittings together in such a manner that they may be disconnected or recoupled with greater facility and ease and at the same time provide a water tight, air tight or gas tight connection. Where deep well piping is concerned, especially deep water wells, it becomes necessary from time to time to remove sections or parts of the piping for repair or replacement purposes but in order to do so it also becomes necessary to set up special apparatus and not infrequently excavate to a considerable depth before the pipe sections, couplings, etc., may be removed for replacement purposes all of which is difficult, disadvantageous and to say the least expensive.

It is therefore one of the objects of the present invention to avoid and overcome the foregoing and other objections and disadvantages by providing a device of this character whereby pipe couplings and connections may be readily and easily connected to or disconnected one from the other.

Another object of the present invention is to provide a device of this character whereby tight coupling joints may be readily and easily effected.

A further object of the present invention is to provide a device of this character which is simple in structure, rugged in nature and one that will the more satisfactorily perform the functions required of it.

Having regard to the foregoing and other objects and advantages which will become apparent as the description proceeds and the details become known, the invention consists in the novel combination and arrangement of parts hereinafter described in more particular detail and illustrated in the accompanying drawings in which:

Fig. 1 is a longitudinal section taken through the vertical center of a deep well disclosing an embodiment of my present invention.

Fig. 2 is an enlarged longitudinal section taken through the center of the female coupling shown in Fig. 1.

Fig. 3 is an enlarged longitudinal section taken through the center of the male coupling shown in Fig. 1.

Fig. 4 is a longitudinal section taken through the center of a modified form of the invention.

Fig. 5 is a section taken on the line 5—5 of Fig. 4.

Fig. 6 is a longitudinal section taken through a further modified form of the present invention.

Fig. 7 is a longitudinal section of another modified form of coupling shown on a reduced scale and with an exchangeable base or female unit.

Fig. 8 is a longitudinal section taken through the center of a further modified form of the invention on a reduced scale with exchangeable female unit, and Fig. 9 is a sectional view of an exchangeable base or female unit for the couplings shown in Figs. 7 and 8.

Referring now to the accompanying drawings wherein the present invention is disclosed and wherein like numerals of reference designate corresponding parts in the various illustrations, the numeral 15 indicates the invention as a whole which in general terms includes a female unit 16 to which a pipe or tube 17 is connected and a male unit 18 to which a pipe or tube 19 is also connected, while the numeral 20 indicates a deep well casing, which, for example, may be a deep water well casing.

As illustrated in Fig. 2, the female unit 16 of the fitting or coupling is shown in T shape form and includes a threaded pipe connection 21 and base reservoir 22 while the end of the fitting opposite the reservoir terminates in the form of a tapered or conoidal seat 24.

As observed in Fig. 3, the male unit 18 of the fitting or coupling is open at both ends with the threaded end 25 arranged at right angles to the main body. The lower end of member 18 is recessed or reduced in diameter at its outer surface as indicated at 27 for the reception of a pipe fitting shoulder 28 of conoidal form while ledge 29 provides an abutting medium for the conoidal shoulder 28.

For purposes of disconnecting and removing male unit 18 with pipe 19 from the female unit 16 where the connection is of the type illustrated in Figs. 1 and 3, the upper end of member 18 is drilled and tapped as indicated for the reception of the threaded end of pull-rod 30 which is secured in position by means of locknut 31 while a handle 32 is provided for the upper end of the pull-rod, the purpose of which will be referred to presently.

Means for connecting the female unit 16 to the casing 20 preferably comprises a hard rubber washer 34, brass washer 35 and locknut 36. By means of this structure, the threaded end 21 of the unit 16 extends through opening 37 in the casing 20 and when locknut 36 is secured to threaded pipe 21, a tight joint is formed and unit 16 securely connected to casing 20.

When in the position shown in Fig. 1, the conoidal shoulder 28 simply rests in the seat 24 and by reason of its gravitational weight plus the fixed position of female unit 16, a tight joint is formed at seat 24 without the aid of bolts, screws or other supplementary accessories. When therefore it becomes necessary or desirable to disconnect and remove male member 18 and pipe 19 for cleaning, replacement or other purposes, handle 32 of pull-rod 30 is grasped and the unit pulled upwardly until it is free of the casing. After cleaning, repair or replacement has been attended to, the unit 18 is then lowered in casing 20 when the male unit with shoulder 28 is again positioned in the seat 24 and the pipe and pump connection is immediately ready for operation. From the foregoing it will be clearly seen that no bolts or other like accessories require to be released or reconnected and no excavating, drilling, etc., is necessary to remove and replace the coupling and pipe 18 and 19.

Referring now to the invention illustrated in Fig. 4, the female unit is open at opposite ends while the seat and shoulder 24 and 28 respectively conform to those shown in Fig. 1. Adjacent its base opening 35, unit 16 is provided with an integrally formed crowfoot or spider 36 which permits passage of fluids while the center of the crowfoot is formed with a threaded orifice 37. A screen or filter 38 extends over the crowfoot and upwarly along the interior walls of the unit 16. At its upper end, male unit 18 is provided with an orifice 39 through which bolt 40 extends while the lower and threaded end of the bolt engages threaded opening 37 of crowfoot 36. By tightening bolt 40, female and male units 16 and 18 are quickly and efficiently secured together and by release of the bolt 40, the units are easily and readily disconnected. This type of structure, it is observed, is advantageously employed in gas pipe lines, oil pipe lines, boiler pipes and other types of fittings and pipings where it more frequently becomes necessary to disconnect, clean or replace sections of pipe, etc.

The modification illustrated in Fig. 6 dispenses with the conoidal shaped structures 24 and 28 and in place thereof the upper end of unit 16 is recessed as indicated at 41 and is adapted to receive therein a washer 42, screen 43 and the lower end of unit 18, the latter being designed to rest upon the washer 42. Thus as in the case of the structures seen in Figs. 1, 2 and 3, gravitational weight plus the fixed position of unit 16 provides a tight, uniform joint and connection between the two elements or units which is easily and readily connected or disconnected as desired or required.

The modified form of structure illustrated in Fig. 7 includes female and male units 16 and 18 respectively and when joined, as shown, pipe connection 25 is disposed at right angles to pipe connection 44. As illustrated, the threaded end of securing bolt 45 engages the threaded seat 46 of unit 16 for releasably locking the units together.

Adjacent its lower end, bolt 45 is provided with a transverse opening 47 which communicates with longitudinal opening or passageway 48 which further in turn registers with outlet opening 49 in pipe connection 44. Thus water or other fluid delivered to pipe connection 25 passes through the units with freedom. A washer 51 and screen 52, similar to those shown in Figs. 4 and 6, are provided for the unit.

In the modified form shown in Fig. 8, the structure follows along the lines of the device shown in Fig. 4, with the fluid outlet at right angles to the inlet of male unit 18. In the structure disclosed in Fig. 8 however the female unit 16 may be detached by removing the bolt 53 from engagement with the crowfoot or spider 54 after which unit 16 is removed and replaced by the female unit shown in Fig. 9. When the unit shown in Fig. 9 is substituted for the female unit shown in Fig. 8, the flow of fluid is in parallel planes at different levels or planes rather than at right angles to one another. Washer 51 and screen 52 are, of course, a part of the unitary structure.

The female unit shown in Fig. 9 provides alternative coupling for the male units shown in Figs. 7 and 8, in that when the female unit shown in Fig. 9 is coupled with the devices of Figs. 7 or 8, the flow of fluid is parallel with the inlet rather than at right angles thereto. When it is desired to substitute the female unit shown in Fig. 9 for the female unit shown in Fig. 7, bolt 45 is released and the female units exchanged and when recoupled the threaded end of bolt 45 engages the threaded portion 55 of the unit shown in Fig. 9, while outlet 50 parallels inlet 25.

On the other hand, where substitution of the female unit shown in Fig. 8 is desired, bolt 53 is released and the respective female units exchanged. When coupled, the threaded end of bolt 53 will engage the threaded socket 56 of the female unit shown in Fig. 9, thus, substitution of a female unit for changing directional flow of fluid is easily and readily facilitated.

From the foregoing it will be seen that the present invention represents novel, practical and yet simplified structure and permits pipes, conduits, tubing and the like to be quickly and easily connected or disconnected for repair, replacement or other purposes. It will also be seen that while the pipe connection or coupling may be retained in operative position by gravitational influence and weight, the male and female units may be retained in releasably coupled position by a securing bolt and that an exchangeable female unit is provided for purposes of changing the directional flow of fluid passing through the coupled unit.

Changes may be made in the above and many apparently widely different embodiments constructed without departing from the spirit or the essential characteristics of the invention. The persent disclosure therefore is intended to be interpreted as illustrative and not in a limitative sense.

What I claim is:

1. In a pipe and tube coupling, a pipe casing, a female unit provided with fluid inlet and outlet passageways rigidly secured to the said pipe casing, the inlet passageway of the said female unit being provided with a seat of conoidal form, a male unit having a downwardly extending pipe with an elbow coupling connecting the upper end thereof, one end of the said coupling being of conoidal shoulder form and adapted to fit into the conoidal seat of the said female unit and to be retained in connected position therewith by gravitational weight, and handle means connected to and extending upwardly from the said male unit for moving the said male unit into and out of seating engagement with the conoidal seat of the female unit.

2. In a pipe and tube coupling, a pipe casing, a female unit provided with fluid inlet and outlet passageways rigidly secured to the pipe casing, the inlet passageway of the said female unit being provided with a seat of conoidal form with the base of the said unit being provided with a reservoir below the level of the said outlet passageway, a male unit having a downwardly extending pipe with an elbow connecting the upper end thereof, the lower end of the said elbow being provided with a conoidal shoulder which is adapted to fit into the conoidal seat of the said female unit and to be retained in connected position therewith by gravitational weight, a filter screen arranged between the said male and female units, and handle means extending upwardly from the said male unit for moving the said male unit into and out of seating engagement with the conoidal seat of the said female unit.

References Cited in the file of this patent

UNITED STATES PATENTS

| | | |
|---|---|---|
| 1,301,453 | Kendall | Apr. 22, 1919 |
| 1,888,245 | Sperling | Nov. 22, 1932 |
| 1,921,533 | Maynard | Aug. 8, 1933 |
| 2,689,611 | Martinson | Sept. 21, 1954 |